United States Patent Office 3,598,842
Patented Aug. 10, 1971

3,598,842
PROCESS FOR THE PREPARATION OF ALKYL-
ATED 2,3-DIHYDROBENZO-FURANS AND AL-
KYLATED 2,3-DIHYDRO-NAPHTHOFURANS
Joseph C. Martini, Houston, Tex., assignor to Gulf Research & Development Company, Pittsburgh, Pa.
No Drawing. Continuation-in-part of application Ser. No. 731,271, May 22, 1968. This application Mar. 24, 1969, Ser. No. 809,947
Int. Cl. C07d 5/36
U.S. Cl. 260—346.2
15 Claims

ABSTRACT OF THE DISCLOSURE

A process is defined for the preparation of cyclic ethers by the condensation of phenolics, such as phenol, with certain aldehydes containing tertiary carbon atoms, such as isobutyraldehyde, using a strong acid catalyst, such as $H_2SO_4$. The single ring phenolics produce alkylated coumaran type cyclic ethers such as 2,2-dimethyl coumaran. The two condensed ring phenolics, such as beta-naphthol, produce the alkylated naphthofuran type cyclic ethers. Beta-naphthol is unique in also producing 3,4,5,6-dinaphtho-2-isopropylpyran, a composition of matter useful as an ultraviolet light absorber. The aqueous hydrogen halides are unique in promoting the selective condensation of meta-cresol with isobutyraldehyde from admixture with para-cresol to allow for the separation and recovery of substantially pure para-cresol.

---

This invention relates to a process for the preparation of cyclic ethers of aromatic compounds containing hydroxyl groups and more particularly to the preparation of 2,2-dialkylsubstituted coumarans and 2,2-dialkylsubstituted naphthofurans.

This application is a continuation-in-part of my copending Ser. No. 731,271, filed May 22, 1968, and assigned to the same assignee as the present application now abandoned.

The reaction of aldehydes, such as formaldehyde, with phenol and other phenolic compounds to form phenolic resins is well known in the art. It has now been found that certain aldehydes, such as isobutyraldehyde, are unique in their reaction with certain phenolic compounds having a hydrogen atom directly attached to the ring carbon atom adjacent the phenolic hydroxyl group to form cyclic ethers.

In accordance with the invention, cyclic ethers of the 2,2-dialkylsubstituted coumaran and 2,2-dialkylsubstituted naphthofuran type are prepared by a process which comprises: condensing an aliphatic aldehyde wherein the carbon atom directly attached to the aldehyde carbonyl group is a tertiary carbon atom having a hydrogen atom attached with a phenolic aryl compound having at least one phenolic hydroxyl group and a hydrogen atom attached to the carbon atom adjacent at least one of the phenolic hydroxyl groups in the contact presence of a strong acid catalyst and under condensation conditions including a temperature of between 80° and 200° C., and thereafter recovering said cyclic ether in substantially pure form.

In one embodiment of this invention, when phenol is the phenolic reactant, the efficiency to the production of cyclic ethers is improved by operating the process in the presence of between 4 and 15 weight percent water.

In another embodiment of this invention it has been found that meta and para-cresol can be effectively separated from admixture with each other by the selective condensation of meta-cresol with isobutyraldehyde in the contact presence of an aqueous solution of a hydrogen halide catalyst under condensation conditions and wherein the molar ratio of the aldehyde to the meta-cresol is about 1.8:1 to 2.2:1.

The phenolic charge stock reactant can be any aryl compound having at least one phenolic hydroxyl group and a hydrogen atom attached to the carbon atom adjacent at least one of the phenolic hydroxyl groups. Suitably, the aryl compounds have between one and four rings which can be condensed or noncondensed. More preferably, the aryl compounds have from one to two rings which may be condensed. That is, the preferred aryl compounds are phenol, naphthol, substituted phenols or substituted naphthols so long as there is a hydrogen atom on at least one of the carbon atoms adjacent at least one of the phenolic hydroxyl groups. By a "phenolic hydroxyl group" is meant a hydroxyl group directly attached to an aromatic ring carbon atom. The substituents can be any group which will not adversely effect or interfere either sterically or chemically with the desired reaction. Suitable substituents, given as examples only, include alkyl groups having between 1 and 20 carbon atoms; halogens, except fluorine; —$NO_2$ groups; hydroxyl groups; and alkoxy groups having between 1 and 20 carbon atoms. The preferred substituents are the hydroxyl groups, lower alkyl groups having from one to ten carbon atoms and the lower alkoxy groups, i.e. —OR′ groups where R′ is an alkyl group having from one to four carbon atoms. Preferably, the aryl compound has from one to two rings and is composed only of carbon, hydrogen and oxygen with the total number of carbon atoms being between 6 and 16. The preferred number of phenolic hydroxyl groups is from one to two.

By "alkyl" in this application is meant to include both saturated and olefinically unsaturated radicals.

One preferred class of aryl compounds can be represented by the general formula below:

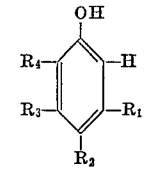

where $R_1$, $R_2$, $R_3$ and $R_4$ can be the same or different and can be hydrogen; a hydrocarbon radical having from 1 to 20 carbon atoms; a hydroxyl group; halogens, except fluorine; —$NO_2$; and —OR where R can be any hydrocarbon having from 1 to 20 carbon atoms; with the proviso that $R_1$ be such that it does not sterically hinder the reaction; and with the additional proviso that any two of the $R_1$, $R_2$, $R_3$ and $R_4$ groups can be cyclized to form a saturated, olefinically unsaturated or aromatic ring. Preferably, the $R_1$ and $R_3$ groups are hydrogen or ortho, para directing groups such as —OH; —OR where R is as defined; —Cl; —Br; and —I; while $R_2$ and $R_4$ are preferably hydrogen or meta directing groups such as —$NO_2$. Most preferred is when $R_1$, $R_2$, $R_3$ and $R_4$ are selected from hydrogen; —OH; —$OCH_3$ and —$CH_3$ groups with no more than two of the $R_1$, $R_2$, $R_3$ and $R_4$ groups being selected from —OH; —$OCH_3$ and —$CH_3$ groups.

A list of suitable aryl-containing compounds includes, but is not limited to: phenol; 3,5-xylenol; m-cresol; p-octadecylphenol; 2,3-xylenol; m-eicosylphenol; 2,5-xylenol; o-chlorophenol; o-nitrophenol; p-allyl phenol; o-cresol; p-octyl phenol; p-cresol; p-propenyl phenol; 2,4-xylenol; o-methoxyphenol; 3,4-xylenol; m-iodophenol; o-ethyl phenol; catechol (o-hydroxyphenol); hydroquinone (p-hydroxyphenol); 2,3,5-trimethylhydroquinone; resorcinol (m-hydroxyphenol); alpha-naphthol; beta-naphthol; 1-hydroxy-8-nitro naphthalene; 1-hydroxy-5-methyl naphthalene; 1-hydroxy-5-octyl naphthalene; and 1-hydroxy-7-chloro naphthalene.

The aldehyde charge stock reactant can be any aliphatic aldehyde wherein the carbon atom directly attached to the aldehyde carbonyl group is a tertiary carbon atom having a hydrogen atom attached. The aldehyde can suitably have between 4 and 20 carbon atoms and preferably has between 4 and 15 carbon atoms. The preferred aldehydes are those having the general formula:

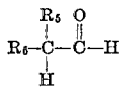

where $R_5$ and $R_6$ can be the same or different and are aliphatic hydrocarbon radicals having between 1 and 17 carbon atoms. Preferably, $R_5$ and $R_6$ are the lower alkyl radicals having from one to four carbon atoms. It is further preferred, although not necessary, that the aldehyde consist only of carbon, hydrogen and oxygen where the oxygen is a portion of the aldehyde carbonyl group. The presence of other elements, such as nitrogen, sulfur, etc., in the aldehyde is not harmful, so long as it does not interfere with the desired reaction.

Examples of suitable aldehydes which can be used in the subject invention include, but are not limited to:

isobutyraldehyde;
2-methylbutyraldehyde;
2-methyl-3-butenal;
2-methylpentaldehyde;
2,3-dimethyl-2-butenal;
2-ethylbutyraldehyde;
2-ethylhexanal;
2-methylundecanal; and
2-methyl-4-pentenal.

The above aldehydes are unique in their ability to condense with the phenolic compounds defined above to yield 2,2-dialkylsubstituted coumarans. The reaction can be represented by the general equation given below:

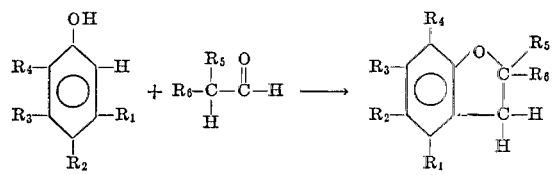

where $R_1$, $R_2$, $R_3$, $R_4$, $R_5$ and $R_6$ are as defined above.

For example, phenol, the simplest phenolic compound, will react with isobutyraldehyde, the simplest aldehyde, to form 2,2-dimethyl coumaran as noted below:

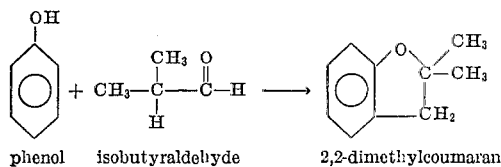

phenol     isobutyraldehyde     2,2-dimethylcoumaran

Other 2,2-dialkyl coumarans can also be formed from single ring hydroxylated phenols depending on the particular phenol and aldehyde employed.

The simplest naphthofuran which can be formed is 2,2-dimethylnaphthofuran, as shown in the equation below:

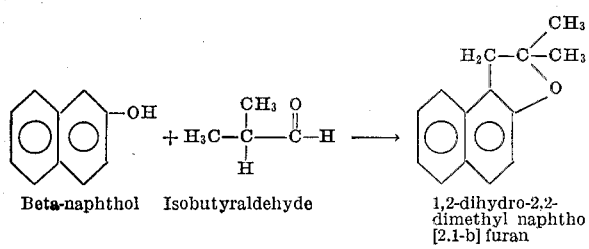

Beta-naphthol   Isobutyraldehyde   1,2-dihydro-2,2-dimethyl naphtho [2.1-b] furan Other 2,2-dialkylsubstituted naphthofurans can be formed utilizing the hydroxylated two condensed ring aryl compounds and aldehydes as defined above.

While the reaction will proceed thermally, the yield of the desired cyclic ether is too small to be of commercial interest. It has been found that the reaction will proceed readily under the influence of a strong non-oxidizing acid catalyst. Strong non-oxidizing acids are well known by those having ordinary skill in the art and include such materials as aluminum chloride which will form a strong acid catalyst (HCl) during the reaction. The preferred acidic materials are the strong non-oxidizing mineral and aryl sulfonic acids such as HCl, HBr, HI, HF, $H_2SO_4$, $H_2SO_3$, $ClHSO_3$, toluene sulfonic acid, and the solid sulfonic type ion exchange materials. Nitric acid is not preferred because of its strong oxidizing properties. Other suitable catalysts include, but are not limited to, $H_3PO_4$; $P_2O_5$; $ZnCl_2$; $SnCl_4$; $BF_3$; etc. Unsuitable weak type acids include oxalic, formic acids and acetic anhydride.

It has been found that a preferred catalyst for the preparation of the cyclic ethers is sulfuric acid having an $H_2SO_4$ content of over 90 percent. Hydrochloric acid results in lower efficiencies, and thus yields, of the desired coumarans except in the instance of beta-naphthol. In the case of the separation of meta and para-cresol, however, the catalyst should be an aqueous hydrogen halide, especially aqueous HCl, in order to selectively react the meta-cresol and obtain para-cresol in substantially pure form. For some reason sulfuric acid promotes the reaction of both meta and para-cresol and results in very poor separation of the meta and para-cresol. The sulfuric acid, however, results in high efficiency of the meta and para-cresol to the formation of coumarans. Since both the aqueous hydrogen halides and sulfuric acid are strong acid catalysts it was expected that both would behave similarly in condensation of a mixture of meta and para-cresol with isobutyraldehyde. It was quite unexpected to find that the aqueous hydrogen halides were unique in promoting the selective condensation of the meta-cresol to allow for the recovery of a substantially pure para-cresol. By aqueous hydrogen halides is meant aqueous HF, HCl, HBr or HI.

It has additionally been found that when phenol is used as the phenolic reactant, the maintenance of water in the reaction zone in amounts between about 4 and 15 weight percent of the reaction mixture, preferably in amounts between 6 and 10 weight percent of the reaction mixture, inhibits the formation of by-product resinous reaction products and promotes the efficiency of the reaction to the formation of the desired cyclic ethers.

The extent of conversion of the aldehyde charge stock is a direct function of the strength of the acid employed. Thus, weak acids, such as oxalic and formic acids, as noted above, result in little to no conversion of the aldehyde charge stock. Strong acids, such as sulfuric, hydrochloric and phosphoric, result in greater conversions with the efficiency to the production of the desired cyclic ethers varying depending upon the conditions in the reaction zone.

The amount of the acid catalyst to employ in the subject reaction is generally quite small, being on the order of 0.1 percent by weight to ten percent by weight of the phenolic reactant, with preferred concentrations of the acid being between 0.3 and 7 percent by weight of the phenolic reactant. As noted above, it is preferred to employ anhydrous acidic materials; however, when aqueous mineral acids are employed, it is preferred to employ them in as high a strength as possible in order to minimize the water content in the reaction zone. Thus, when sulfuric acid is employed it is preferred to use sulfuric acid having an $H_2SO_4$ content of from 60 to 100 percent or above (fuming), more preferably between 80 and 100 percent and above, and most preferably 98 percent and above. When hydrochloric acid is employed the commercial 37 percent solution is satisfactory. When phosphoric acid is employed glacial phosphoric is preferred, although not essential. When Friedel-Crafts type catalysts are employed, such as zinc chloride and aluminum chloride, the amounts should also be within the ranges set forth above.

The most preferred catalysts are the strong acid type ion exchange resins. These catalysts are preferred since they are anhydrous and are easily separable from the reaction products. In addition, the ion exchange resins can be used in a flow type system, and thus a continuous process is easily achieved. Suitable ion exchange resins can be those described in the Kirk-Othmer Encyclopedia of Chemical Technology, second edition, volume 11, pages 871 et seq. or in U.S. Pat. 3,049,569, columns 4 and 5. Among the ion exchange materials suitable for use in the process of this invention are the sulfonated styrene-divinylbenzene copolymers, sulfonated crosslinked styrene polymers, and the like. There are many types of ion exchange resins available commercially under trademarks such as the Amberlite resins by Rohm and Haas and Dowex by Dow Chemical Company.

The equivalent ratio of isobutyraldehyde to the phenolic reactant can suitably be from 0.5 to 2.0. The preferred equivalent ratios are from 0.8 to 1.2. Ratios lower than 0.5 can be used, such as 0.1 or lower, but this serves no particular advantage and in fact results in negligible yields of the desired cyclic ethers. Isobutyraldehyde has one equivalent aldehyde function per molecule of isobutyraldehyde. One aldehyde function is capable of reacting with one phenolic hydroxyl group provided the carbon atom adjacent the hydroxyl group contains a hydrogen atom. The phenolic reactants can contain more than one reactive phenolic hydroxyl group per molecule. A phenolic reactant with two reactive phenolic hydroxyl groups has two equivalents per mole, and likewise a phenolic reactant with three reactive hydroxyl groups has an equivalency of three. Thus, when isobutyraldehyde and phenol are employed as the reactants, an equivalent ratio of one is the same as a molar ratio of one, while when resorcinol is employed with isobutyraldehyde an equivalent ratio of one is equal to a molar ratio of aldehyde to phenolic reactant of 2:1.

An inert solvent can be used to aid in contacting the reactants, to maintain any resin formed (some by-product phenolic resin can form) in solution, to aid in maintaining the reaction temperature and to aid in the removal of the water of reaction if desired. The preferred solvents are the organic solvents, for example, the aromatic hydrocarbons such as benzene, toluene and xylene. It is preferred that the solvent be such that the reactants are maintained in a homogeneous phase.

The reaction temperature can suitably be from 80° to 200° C. The preferred reaction temperatures are from 90° C. to 150° C. Temperatures lower than 80° C. are not suitable since the amount of coumaran produced is so small as to be of little commercial significance. Temperatures above 200° C. are undesirable since they tend to promote larger amounts of the resinous by-product than are desirable.

The reaction pressure is not critical and can suitably be from atmospheric or below to 1000 p.s.i.g. or higher. Atmospheric pressure is, of course, preferred for economic reasons. The pressure should be sufficient to maintain the aldehyde and phenolic reactants in the liquid phase.

The reaction time is not critical. Suitable reaction times can be as low as several minutes to 20 hours or more. Preferred reaction times are between 0.5 and 10 hours, with the most preferred reaction times between 2 and 8 hours. The reaction time is, of course, a function of the reaction temperature, catalyst, catalyst concentration and reactivity of the aldehyde and phenolic charge stocks. Anyone with ordinary skill in the art can determine from a few simple experiments an optimum reaction time for the particular set of conditions, type of reactants and catalysts he employs.

The aldehyde will react with the phenolic reactant to yield the desired 2,2-dialkyl coumaran, some resinous products having a molecular weight between 300 and 800 and small amounts of the by-products, such as further alkylated 2,2-dialkyl coumarans containing one or two additional unsaturated alkyl groups. For example, the reaction of meta-cresol with isobutyraldehyde yields the products as shown in the equation below:

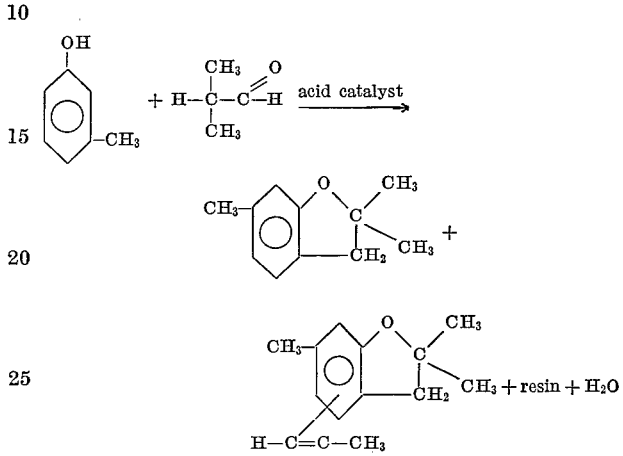

Beta-naphthol appears to be unique in the production of not only the desired cyclic ether by the condensation of a single molecule of beta-naphthol with a single molecule of the aldehyde, but also results in the production of a cyclic ether formed by the condensation of two molecules of the beta-naphthol with one molecule of aldehyde. For example, isobutyraldehyde will condense with beta-naphthol as follows:

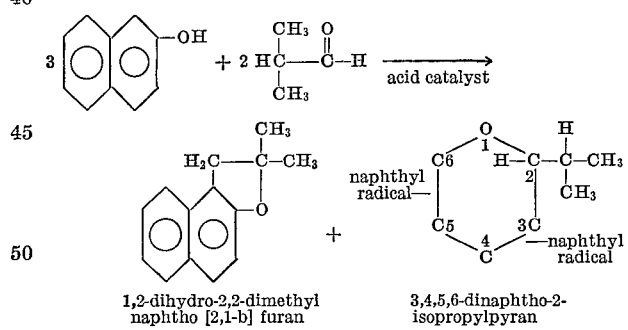

1,2-dihydro-2,2-dimethyl naphtho [2,1-b] furan 3,4,5,6-dinaphtho-2-isopropylpyran Minor amounts of by-products such as alkylated beta-naphthol were produced when sulfuric acid was used as the catalyst.

The 3,4,5,6-dinaphtho-2-isopropylpyran (hereinafter referred to as DNIP) is useful as an ultraviolet light absorber in plastic materials such as polyvinylchloride or polyethylene.

The condensation of beta-naphthol with the aldehydes defined above is also unique in its high selectivity to the production of the two products defined above. Very little by-products or resin are produced. In addition, the selectivity of the beta-naphthol condensation to either the furan or pyran type product is effected by the specific acid catalyst employed. Thus, when hydrochloric acid was employed, the reaction product was principally the furan type product while when sulfuric acid was employed, the principal product was the pyran type product.

Alpha-naphthol reacts as expected with the aldehydes defined above to give a cyclic ether condensation product containing one molecule of the alpha-naphthol and one molecule of the aldehyde. For example,

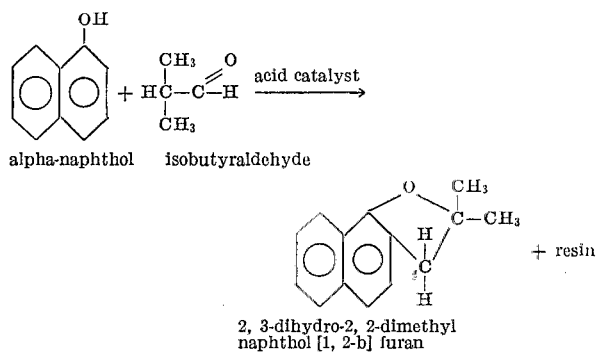

alpha-naphthol   isobutyraldehyde 2, 3-dihydro-2, 2-dimethyl naphthol [1, 2-b] furan There is nothing critical about the manner of admixing the reactants. The aldehyde and phenolic reactants can suitably be added separately or together to a reaction vessel and the acid catalyst and solvent, if employed, added before, after or during the addition of the reactants. Preferably the acid catalyst is added to a mixture of the aldehyde-phenolic reactants containing a solvent, if employed. The reaction mixture can then be heated to the desired reaction temperature by any suitable means. The reactants can also, of course, be preheated separately or together before entering the reaction zone, this latter method being more suitable to a continuous type of operation. After a suitable reaction time the by-products are recovered by any suitable means such as by distillation or by caustic washing followed by distillation. The recovery of the pyran type product from the condensation of beta-naphthol can occur suitably by crystallization of the furan free product.

The invention will be further described with reference to the following experimental work.

In all of the experiments to follow, the phenolic reactant was admixed with the aldehyde, usually isobutyraldehyde, the solvent when employed and the acid catalyst. This admixture was then heated to the desired reaction temperature and was maintained at this temperature for between five minutes and five hours or more. Unless indicated otherwise, the water of reaction was removed substantially as quickly as it was formed. After reaction, the products were nuetralized by washing with a dilute solution of sodium hydroxide. It was found that the unreacted phenolic charge stock could be recovered dissolved in the aqueous sodium hydroxide and the cyclic ethers recovered from the organic layer by distillation and/or crystallization.

EXAMPLE 1

In the run for this example meta-cresol was reacted with isobutyraldehyde in a 1:1 molar ratio utilizing toluene as a solvent and three weight percent sulfuric acid (98 percent $H_2SO_4$) based on the meta-cresol at a temperature of 91° to 140° C. for three hours. The conversion of meta-cresol was 79 percent, which was calculated by dividing the amount of recovered meta-cresol by the total meta-cresol charged multiplied by 100. The yield of 2,2,6-trimethyl coumaran, the desired coumaran, was 71.5 percent. The yield in this and other examples was calculated by dividing the moles of the coumaran actually produced by the moles which theoretically could have been produced based on the amount of meta-cresol reacted times 100. 80.3 grams of resin were formed. The efficiency to the production of the desired coumaran was 90.7 percent, which was calculated, of course, by dividing the yield by the conversion figures above. The results of Example 1 are summarized in Table I below.

EXAMPLE 2

Example 1 was repeated except the catalyst was 27 grams of a sulfonic type ion exchange resin. The conversion, yield and efficiency were 77 percent, 64.5 percent and 83.8 percent respectively. The results of this run are shown on Table I below. 66.2 grams of resin were formed, having a molecular weight of 445.

A comparison of Examples 1 and 2 shows that sulfuric acid or a sulfonic type ion exchange resin are both suitable catalytic materials for the preparation of the desired cyclic ethers. The solid ion exchange resin is preferred for ease of separation and for the production of lesser amounts of by-product resin.

A series of runs was made using phenol as the phenolic reactant and wherein the weight percent water in the reaction mixture was varied.

EXAMPLE 3

Example 1 was repeated except phenol was the phenolic reactant and the reaction time was reduced to two hours. The conversion, yield and efficiency to the production of 2,2-di-methyl coumaran, the desired cyclic ether, was 55 percent, 31.6 percent and 57.4 percent respectively. 337.1 grams of resin were formed.

A comparison of Examples 3 and 1 shows that phenol is more difficult to convert than meta-cresol, and the efficiency and yield of cyclic ethers are much lower. Results of this run are summarized in Table I below.

EXAMPLE 4

Example 3 was repeated except the phenol charge contained eight percent by weight water and the reaction temperature was maintained at 88° C. Only 192 grams of resin having a molecular weight of 507 were produced. The conversion, yield and efficiency to production of 2,2-dimethyl coumaran were 40 percent, 34.5 percent and 86.2 percent respectively. The results of this run are summarized in Table I below.

EXAMPLE 5

Example 4 was repeated except water was used as the solvent and the reaction time was increased to 9½ hours. The weight percent water in the reaction mixture was 24.6. There was substantially no conversion with only traces of coumaran formed. The results of this run are also summarized in Table I below.

EXAMPLE 6

Example 5 was repeated except the reaction time was reduced to five hours and the weight percent sulfuric acid was increased to 30. Water was not removed from the reaction zone so the total weight of water was 27.4 percent. The conversion of phenol was 60.5 while the yield of 2,2-dimethyl coumaran was 11.4 percent, giving an efficiency of 18.9 for the production of coumaran. 248.2 grams of resin having a molecular weight of 870 were formed. This run is summarized in Table I below.

A comparison of Examples 3 and 4 shows that less resin and a higher efficiency to the production of 2,2-dimethyl coumaran results when a small amount of water is present in the reaction zone (Example 4) than when the reaction is run anhydrous (Example 3). Too much water, however (Example 5) results in no conversion when small amounts of sulfuric acid are used, i.e. three weight percent. Example 6 shows that when large concentrations of the acid are used, conversion of phenol is obtained but the efficiency to the production of coumarans is low. Example 3–6 show that when phenol is used as the phenolic reactant and coumarans are desired as the product, the amount of water in the reaction zone should be about eight weight percent.

EXAMPLE 7

Example 1 was repeated except ortho-cresol was employed as the phenolic reactant. 228 grams of resin were formed as a by-product. The conversion of ortho-cresol was 71.6 percent, giving a yield of 45.7 percent for 2,2,7-trimethyl coumaran, the desired cyclic ether. The efficiency to the production of the desired cyclic ether was 63.8. The results of this run are summarized on Table I.

EXAMPLE 8

Example 7 was repeated except para-cresol was used as the phenolic reactant, no solvent was employed and the catalyst was one percent (based on the para-cresol) of anhydrous HCl added as a 37 percent aqueous solution. The water was left in the reaction zone and 196 grams of resin were formed, having a molecular weight of 355. The conversion of para-cresol was 65.6 percent with a yield and efficiency to 2,2,5-trimethyl coumaran, the desired cyclic ether, of 22.1 percent and 33.7 percent respectively.

A comparison of Examples 1, 7 and 8 shows that sulfuric acid is the preferred catalyst over hydrochloric to obtain cyclic ethers from phenolic charge stocks.

EXAMPLE 9

Example 7 was repeated except alpha-naphthol was utilized in place of ortho-cresol. The mole ratio of aldehyde to phenol was reduced to 0.8:1 and the amount of sulfuric acid was reduced to 0.3 weight percent. The conversion of alpha-naphthol was 75 weight percent with the yield and efficiency to 2,3 - dihydro - 2,2-dimethyl naphtho[1,2-b]furan, the desired cyclic ether, being 43.1 and 57.4 percent respectively.

EXAMPLE 10

In the run for this example beta-naphthol was reacted with isobutyraldehyde in a mole ratio of 1.1:1 using ethanol as the solvent at a temperature of 80° C. for a reaction time of 0.5 hour. The catalyst was a 37 percent solution of HCl used in an amount of 6.7 percent by weight based on the beta-naphthol of anhydrous HCl. The water was not removed during the reaction. Substantially no resin was formed as a by-product. The conversion of beta-naphthol was 78.4, and the yield and efficiency to the production of 1,2-dihydro-2,2-dimethyl naphtho[2,1-b]furan, the desired cyclic ether, was 74.6 and 95 percent respectively. Also produced was 3,4,5,6-dinaphtho-2-isopropylpyran in a yield of about five weight percent.

The 3,4,5,6-dinaphtho-2-isopropylpyran, i.e. DNIP, is selected from the group consisting of:

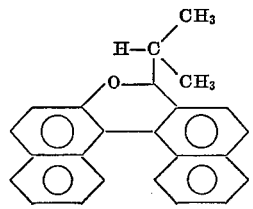

and

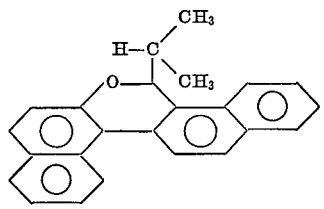

The DNIP has a parent peak by mass spectroscopy of m/e 324; a base peak of m/e 281 corresponding to the loss of 43 mass units

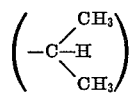

The aromatic to aliphatic ratio as determined by nuclear resonance of 12/8, a doublet methyl band at 0.9 p.p.m. indicative of the isopropyl group; a one proton doublet at 5.10 p.p.m. due to a proton alpha to oxygen and an aromatic ring; and a one proton multiplet at 2.2 p.p.m. resulting from the tertiary proton of the isopropyl group. Infrared analysis indicated an aromatic ether group (~1250 cm.$^{-1}$); an absence of hydroxyl protons; and the substitution pattern of the aromatic system indicates four and two adjacent ring hydrogens. The melting point was 157° C.–158° C.

*Analysis.*—Calcd. for $C_{24}H_{20}O$ (percent): C, 88.85; H, 6.21; O, 4.93. Found (percent): C, 88.72; H, 6.22; O, 5.31.

EXAMPLE 11

Example 10 was repeated except no ethanol solvent was employed, the reaction temperature was increased to 95°–108° C., the reaction time was three hours and the catalyst was three percent by weight of the beta-naphthol of sulfuric acid having an $H_2SO_4$ content of 98 percent. The conversion of the beta-naphahol was 90 percent. The product was caustic washed to remove unreacted beta-naphthol as a caustic soluble. The caustic insolubles were dried and extracted with diethylether. A white precipitate was obtained in an amount of 92 grams and analysis showed it to be DNIP. The physical properties are shown in Example 10 above. The extracted portion was treated to remove the ether and analysis showed it to be the desired cyclic ether 1,2-dihydro-2,2-dimethyl naphtho[2,1-b]furan.

The yield of recovered, in hand, crystallized DNIP was 22 percent. The DNIP was found to absorb in the ultraviolet spectrum in the 300–335 millimicron range. Plastics, such as polyvinylchloride and polystyrene are sensitive to ultraviolet light in this range and thus can suitably be protected with DNIP.

EXAMPLE 12

In the run for this example, 216 grams (2 moles) of a mixture of meta and para-cresol, containing 50 weight percent meta-cresol, was reacted with two moles of isobutyraldehyde at a temperature between 95°–98° C. for five hours using 1.5 percent by weight of the cresol of sulfuric acid having an $H_2SO_4$ content of 98 percent. Water was not removed during the reaction. The conversion of the cresols was 65 percent, and the yield and efficiency to the formation of a mixture of 2,2,6-trimethyl coumaran and 2,2,5-trimethyl coumaran was 49.5 and 76 percent respectively. The recovered unreacted cresols contained 26.8 percent by weight meta-cresol. 69.2 grams of a resinous by-product having a molecular weight of 565 was obtained. This run is summarized on Table I.

EXAMPLE 13

In the run for this example, 0.7 mole (145.6 grams) of para-octyl phenol was reacted with 0.7 mole of isobutyraldehyde at 78°–79° C. for five hours using toluene as the solvent and five percent by weight sulfuric acid having an $H_2SO_4$ content of 98 percent as the catalyst. The conversion of the para-octyl phenol was 66.6 percent and the yield and efficiency to the production of the desired 2,2-dimethyl-4-octyl coumaran was 10.4 and 15.6 percent respectively. The water of reaction was not removed. Table I contains a summary of this run.

EXAMPLE 14

In the run for this example, two moles (216 grams) of meta-cresol were reacted with two moles of 2-ethylhexaldehyde at a temperature of 115°–144° C. for one hour using toluene as the solvent and three percent by weight of the meta-cresol of sulfuric acid having an $H_2SO_4$ content of 98 percent as the catalyst. The conversion of meta-cresol was 85 percent and the efficiency and yield of the desired 2-ethyl-2-n-butyl-6-methyl coumaran was 47.6 percent and 40.5 percent respectively. The water of reaction was removed substantially as quickly as formed. The amount of resin recovered was 217.8 grams having a molecular weight of 445. Table I contains a summary of this run. Examples 12–14 show that various phenolics and aldehydes can be employed in the process of this invention.

TABLE I

| Ex. No. | Charge stock | | | Mole ratio aldehyde to phenol | Solvent | Reaction conditions [1] | | Catalyst [2] | Results percent | | |
|---|---|---|---|---|---|---|---|---|---|---|---|
| | Phenol | Grams | Moles | Aldehyde | | | Temp., °C | Time, hrs. | | Conversion | Yield | Efficiency |
| 1 | m-cresol | 864 | 8 | Isobutyraldehyde | 1/1 | Toluene | 91–140 | 3 | 3% H₂SO₄ | 79 | 71.5 | 90.7 |
| 2 | do | 216 | 2 | do | 1/1 | do | 95–149 | 3 | 27 g. sulfonic ion exchange resin [3]. | 77 | 64.5 | 83.8 |
| 3 | Phenol | 470 | 5 | do | 1/1 | do | 96–130 | 2 | 3% H₂SO₄ | 55 | 31.6 | 57.4 |
| 4 | do | [4] 510 | 5 | do | 1/1 | do | 89–88 | 2 | 3% H₂SO₄ | 40 | 34.5 | 86.2 |
| 5 | do | [4] 510 | 5 | do | 1/1 | Water | 78–80 | 9½ | 3% H₂SO₄ | | | |
| 6 | do | [4] 204 | 2 | do | 1/1 | do | 87–92 | 5 | 30% H₂SO₄ | 60.5 | 11.4 | 18.9 |
| 7 | o-Cresol | 864 | 8 | do | 1/1 | Toluene | 95–145 | 3¾ | 3% H₂SO₄ | 71.6 | 45.7 | 63.8 |
| 8 | p-Cresol | 216 | 2 | do | 1/1 | None | 90–96 | 5 | 1% HCl | 65.6 | 22.1 | 33.7 |
| 9 | α-Naphthol | 180 | 1.25 | do | 0.8/1 | Toluene | 90–160 | 3 | 0.3% H₂SO₄ | 75 | 43.1 | 57.4 |
| 10 | b-Naphthol | 144.2 | 1 | do | 1.1/1 | Ethanol | 80 | ½ | 6.7% HCl | 78.4 | 74.6 | 95 |
| 11 | do | 360 | 2.5 | do | 1/1 | None | 95–108 | 3 | 3% H₂SO₄ | 90 | 22 | |
| 12 | Mixture m,p-cresol | 216 | 2 | do | 1/1 | do | 95–98 | 5 | 1.5% H₂SO₄ | 65 | 49.5 | 76 |
| 13 | p-Octyl phenol | 145.6 | 0.7 | do | 1/1 | Toluene | 78–79 | 5 | 5% HS₂O₄ | 66.6 | 10.4 | 15.6 |
| 14 | m-cresol | 216 | 2 | 2-ethylhexaldehyde | 1/1 | do | 115–144 | 1 | 3% H₂SO₄ | 85 | 40.5 | 47.6 |

[1] In all runs the pressure was atmospheric.
[2] In all runs the sulfuric acid wa 98% H₂SO₄ and the HCl was added as a 37% aqueous solution.
[3] Rohm & Haas Amberlyst No. 15.
[4] 92% phenol charged (8% water).

EXAMPLE 15

Example 1 was repeated except benzene was utilized as the solvent. The temperature was maintained from 85° to 110° C. The conversion of meta-cresol was 76.9 percent. A yield of 71.8 percent with an efficiency of 93.4 percent was obtained. 82.3 grams of resin were formed, having a molecular weight of 480.

EXAMPLE 16

Example 1 was repeated at a temperature from 100° to 175° C. utilizing xylene as a solvent. The conversion, yield and efficiency were 82.4 percent, 64 percent and 77.7 percent respectively. There were 64.8 grams of resin formed having a molecular weight of 425.

A comparison of Examples 1, 15 and 16 shows that a wide temperature range can be employed in this reaction.

EXAMPLE 17

One mole (108 grams) of meta-cresol was reacted with one mole of crotonaldehyde (2-butenal) at a temperature of 108° to 141° C. for 1½ hours using toluene as the solvent and three percent by weight of the meta-cresol of sulfuric acid having an H₂SO₄ content of 98 percent as the catalyst. No coumarans could be detected in the reaction product. However, there was obtained 151.1 grams of resin with a molecular weight of 560.

EXAMPLE 18

Example 17 was repeated except that tigaldehyde (2-methyl-2-butenal) was used in place of 2-butenal. The reaction temperature was 104° to 124° C. for two hours. Again, no coumarans were detected in the reaction product. 159.9 grams of resin with a molecular weight of 545 was obtained. Examples 17 and 18 show that the #2 carbon atom must be a tertiary carbon atom.

Examples 17 and 18 show certain aldehydes are unsuitable for use in the subject reaction. Crotonaldehyde (Example 17) does not have the requisite tertiary carbon attached to the aldehyde carbonyl group and 2-methyl-2-butenal fails to have the requisite hydrogen atom attached to the tertiary carbon atom adjacent the carbonyl group.

A series of runs was also made to recover substantially pure para-cresol from admixture with meta-cresol by selective condensation of the meta-cresol with isobutyraldehyde using an aqueous solution of HCl (37 percent) as the catalyst. The molar ratio of the isobutyraldehyde to the meta-cresol varied from 0.8:1 to 2:1. The results of these runs (Examples 19–23) are given in Table II below.

Referring to Table II, it can be seen that the meta-cresol selectively condenses with the isobutyraldehyde, especially as the molar ratio of the aldehyde to meta-cresol approaches 2:1. In Example 22, where the molar ratio of isobutylraldehyde to meta-cresol was 2:1, the purity of the para-cresol recovered was 100 percent.

A comparison of Examples 12 and 23 shows that HCl is unique in its ability to selectively condense the meta-cresol with the isobutyraldehyde. In Example 12, the molar ratio of isobutyraldehyde to meta-cresol was 2:1 but the recovered cresols contained 26.8 percent meta and only 73.2 percent para-cresol. These poorer results were obtained because sulfuric acid was used as the catalyst rather than a hydrogen halide.

TABLE II

| Example No | 19 | 20 | 21 | 22 | 23 |
|---|---|---|---|---|---|
| Charge stock: | | | | | |
| Phenol | Mixture of m- and p-cresol | | | | |
| Percent m-cresol | 60 | 60 | 60 | 60 | 50 |
| Total grams | 180 | 180 | 180 | 900 | 216 |
| Total moles | 1.67 | 1.67 | 1.67 | 8.35 | 2 |
| Aldehyde | Isobutyraldehyde | | | | |
| Mole ratio aldehyde to m-cresol | 0.8/1 | 0.9/1 | 1/1 | 1.2/1 | 2/1 |
| Reaction conditions: | | | | | |
| Temp.,° C | 98–107 | 94–120 | 97–104 | 100–113 | 89–103 |
| Time, hrs | 3 | 3 | 5 | 5 | 3 |
| Pressure | Atomspheric | | | | |
| Catalyst: wt. percent anhydrous HCl [1] | 0.73 | 0.73 | 2.2 | 0.8 | 2 |
| Results: | | | | | |
| Wt. percent conversion of cresols | 61.5 | 68.5 | 66.7 | 69 | 69 |
| Yield of coumaran | 14 | 25.4 | 15.1 | 11.7 | 8.5 |
| Efficiency to coumarans | 22.8 | 37.2 | 22.6 | 17.3 | 12.3 |
| Resin: | | | | | |
| Wt., grams | 126.6 | 133.9 | 165.1 | 936.8 | 251 |
| Molecular wt | 360 | 390 | 415 | 440 | 525 |
| m-Cresol recovered based on percent charged | 23.3 | 17.3 | 12.3 | 8.9 | 0 |
| p-Cresol recovered based on percent charged | 54.2 | 52.1 | 54.3 | 44.4 | 62.6 |
| Purity of p-cresol recovered | 60.8 | 66.7 | 74.6 | 76.9 | 100 |

[1] Added as a 37% aqueous solution.

EXAMPLE 24

Example 22 was repeated except formaldehyde was used in place of isobutyraldehyde, the reaction time was increased to five hours, and 1.5 percent by weight of the cresols of anhydrous HCl added as a 37 percent aqueous HCl solution was employed as the catalyst. Substantially all of the meta and para-cresol reacted to form resin for only 0.9 percent by weight para-cresol was recovered, 252.7 grams of resin were recovered.

EXAMPLE 25

Example 23 was repeated except n-butyraldehyde was used in place of the formaldehyde. Substantially the same results were obtained.

A comparison of Examples 23–25 shows the importance of employing an aldehyde as defined herein for the successful recovery of a substantially pure para-cresol from admixture with meta-cresol.

EXAMPLE 26

In the run for this example, 31.0 grams (0.25 mole) of para-methoxyphenol and 18.0 grams of isobutyraldehyde were combined in 100 ml. of toluene and 0.3 ml. of sulfuric acid having an $H_2SO_4$ content of 98 percent. After refluxing for four hours using a Dean-Stark trap, four ml. of water were collected. The toluene was distilled and discarded. The crude product was distilled and washed with five percent sodium hydroxide solution and water. 7.9 grams of the desired 2,2-dimethyl-5-methoxy coumaran were recovered for a yield of 17.8 percent.

Example 26 shows another type of substituted phenol which can be successfully employed in the process of this invention.

Resort may be had to such variations and modifications as fall within the spirit of the invention and the scope of the appended claims.

I claim:

1. A process for the preparation of cyclic ethers selected from the group consisting of 2,2-dialkylsubstituted coumarans and 2,2-dialkylsubstituted naphthofurans which comprises:
   condensing an aliphatic aldehyde consisting of carbon, hydrogen and a single aldehyde carbonyl group and having between 4 and 20 carbon atoms and wherein the carbon atom directly attached to the aldehyde carbonyl group is a tertiary carbon atom having a hydrogen atom attached with
   a phenolic aryl compound having from 1 to 2 phenolic hydroxyl groups having from 1 to 2 rings and a hydrogen atom attached to the carbon atom adjacent at least one of the phenolic hydroxyl groups
   in the contact presence of a strong non-oxidizing acid catalyst and under condensation conditions including a temperature of between 80° and 200° C., and
   thereafter recovering said cyclic ether in substantially pure form.

2. A process according to claim 1 wherein the aldehyde has the general formula:

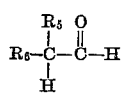

where $R_5$ and $R_6$ are aliphatic hydrocarbon radicals having between 1 and 17 carbon atoms and wherein the total number of carbon atoms in the aldehyde is from 4 to 20.

3. A process according to claim 2 wherein the phenolic aryl compound has the formula:

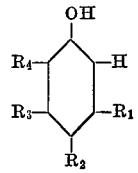

where $R_1$, $R_2$, $R_3$ and $R_4$ are selected from the group consisting of hydrogen, —OH, —OCH$_3$ and —CH$_3$ groups with no more than two of the $R_1$, $R_2$, $R_3$ and $R_4$ groups selected from —OH, —OCH$_3$ and —CH$_3$.

4. A process according to claim 1 wherein the acid catalyst is selected from the class consisting of the strong non-oxidizing mineral acids, the sulfonic type acidic ion exchange resins, and the organo sulfonic acids.

5. A process according to claim 3 wherein the aldehyde is isobutyraldehyde.

6. A process according to claim 3 wherein the aldehyde is 2-ethylhexaldehyde.

7. A process according to claim 5 wherein the catalyst is sulfuric acid.

8. A process according to claim 3 wherein the phenolic aryl compound is beta-naphthol.

9. A process according to claim 3 wherein the phenolic compound is phenol.

10. A process according to claim 9 wherein the process is operated in the presence of between 4 and 15 weight percent water.

11. A process according to claim 10 wherein the catalyst is sulfuric acid having an $H_2SO_4$ content in excess of 90 percent.

12. A process according to claim 3 wherein the phenolic aryl compound is a cresol.

13. A process according to claim 3 wherein the phenolic aryl compound is alpha-naphthol.

14. A process according to claim 1 wherein the acid catalyst is selected from the group consisting of mineral acids; aryl sulfonic acids; solid sulfonic type ion exchange materials; aluminum chloride; $P_2O_5$; $ZnCl_2$; $SnCl_4$; and $BF_3$.

15. A process according to claim 14 wherein the acid catalyst is selected from the group consisting of HCl; $H_2SO_4$; ClHSO$_3$; toluene sulfonic acid; solid sulfonic type ion exchange materials; aluminum chloride; $H_3PO_4$ and $P_2O_5$.

References Cited

Chemical Abstracts—Belgium Pat. 636,423 (1964), vol. 61, p. 14876 e.

ALEX MAZEL, Primary Examiner

B. I. DENTZ, Assistant Examiner

U.S. Cl. X.R.

260—45.8, 346.2M, 345.3

PO-1050
(5/69)

UNITED STATES PATENT OFFICE
CERTIFICATE OF CORRECTION

Patent No. 3,598,842          Dated August 10, 1971

Inventor(s) Joseph C. Martini

It is certified that error appears in the above-identified patent and that said Letters Patent are hereby corrected as shown below:

Col. 6, lines 23-28 (specifically line 28), that part of the formula which reads:

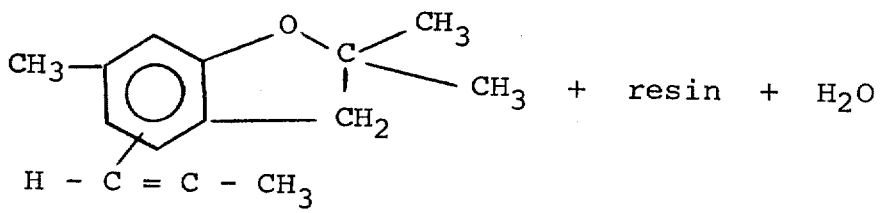

should read

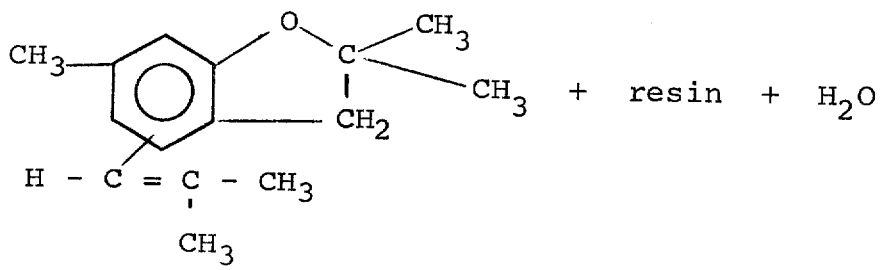

Col. 7, line 18, "naphthol" should be --naphtho--
Col. 10, line 15, "beta-napahol" should be --beta-naphthol--.

Signed and sealed this 4th day of April 1972.

(SEAL)
Attest:

EDWARD M. FLETCHER, JR.       ROBERT GOTTSCHALK
Attesting Officer               Commissioner of Patents